Apr. 17, 1923.  1,452,439

E. R. RITTER

ATTACHABLE BRAKE

Filed Nov. 24, 1919

Inventor
Elmer R. Ritter
By Clarence Perdew
Attorney.

Patented Apr. 17, 1923.

1,452,439

UNITED STATES PATENT OFFICE.

ELMER R. RITTER, OF CINCINNATI, OHIO, ASSIGNOR TO STEVE A. WUESTEFELD, OF CINCINNATI, OHIO.

ATTACHABLE BRAKE.

Application filed November 24, 1919. Serial No. 340,157.

*To all whom it may concern:*

Be it known that I, ELMER R. RITTER, a citizen of the United States, residing at Cincinnati, in the county of Hamilton and State of Ohio, have invented certain new and useful Improvements in Attachable Brakes, of which the following is a specification.

My invention relates to road-vehicle brakes, and more especially to motor-vehicle brakes; that herein shown being especially applicable to motor vehicles of a certain kind which are in use in very large numbers throughout the country.

The object of my invention is to provide this kind of vehicle, or any other kind of vehicle wherein the same conditions are met, with a more effective and powerful stopping means, which can be more certainly depended upon in emergencies, thereby relieving the driver of the anxiety and watchfulness occasioned by the inadequacy of the brakes with which such vehicles are regularly equipped.

A further object is to relieve the transmission and differential mechanism and connecting parts, as well as the axles, of the braking strain which is occasioned by the use of the brake between the motor and the transmission mechanism in these vehicles as regularly constructed.

Another object is to make it very easy to apply such a braking equipment to those of these vehicles which are in use, so that the driver, owner, or other person concerned, even without much mechanical skill or the use of any but the simplest tools, may quickly and inexpensively provide for these added advantages in a vehicle of the kind alluded to, or to other kinds of vehicles wherein similar conditions prevail and the construction permits of the use of the invention in substantially the arrangement shown herein.

Other objects will appear in the course of the ensuing description.

I attain the mentioned objects by the device illustrated, for example, in the accompanying drawing, in which—

Figure 1:
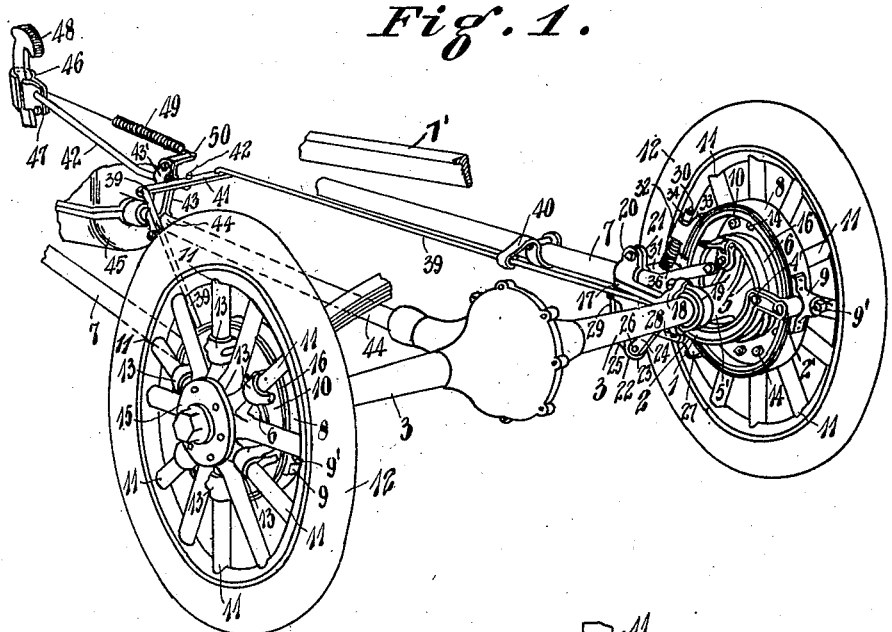
Figure 1 is a general perspective view of the rear parts of the chassis of the alluded to kind of vehicle, with an embodiment of my invention applied thereto, and also showing such parts of the front mechanism of the vehicle as are involved with the application of the invention thereto.
Figure 2:
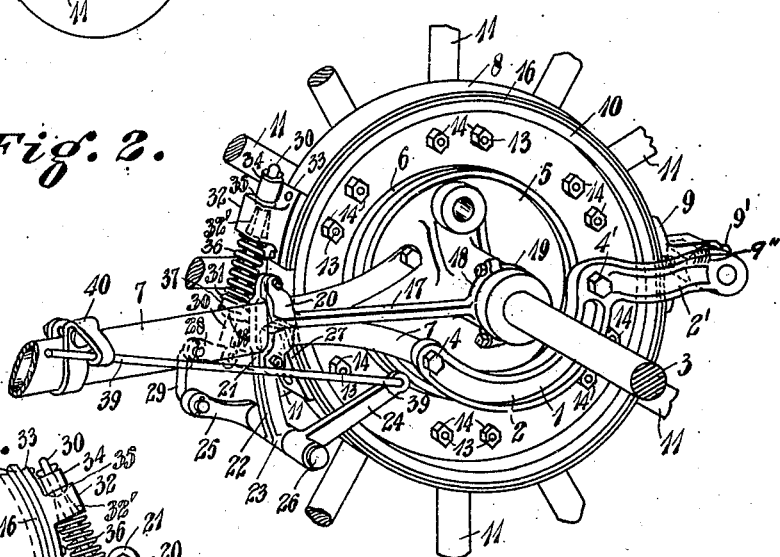
Fig. 2 is an enlarged general perspective view of the equipment, taken from in front of the rear axle and inside the chassis.
Figure 3:
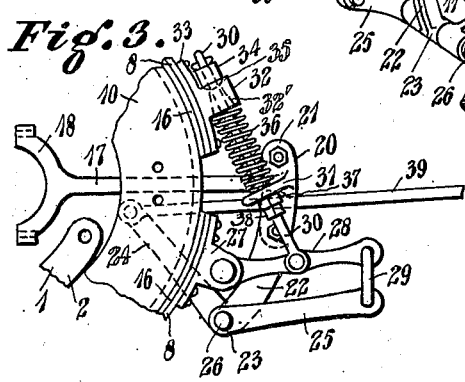
Fig. 3 is a partial side elevation of the equipment removed from the vehicle to more clearly reveal the brake-operating mechanism.

As I prefer to construct my invention, there is a yoke 1 that has a forward part 2 curving under the vehicle rear axle 3, with its front end part secured by a screw 4 to the circular axle-housing end plate 5 which forms part of the vehicle next to the emergency brake 6, as usually constructed. This screw 4 is screwed in through the lower member of the radius rod 7 instead of the screw regularly attaching this member to the plate 5. This yoke also comprises a part 2' extending rearwardly; and at the junction of the parts 2 and 2' of the yoke, it is further secured to the plate 5 by a screw 4'. The relation of the chassis frame 7', part only of which is shown in Fig. 1, to the other parts is well known and needs no detailed disclosure.

The brake-band 8 is transversely flat and of almost completely circular extent, with its separated ends forward. It has fixed to its extreme rear part the bracket 9 with a recess adjustably receiving an outwardly extended stud on the rear end part of the yoke 1. The just described supporting parts are so arranged that the brake-band 8 may be adjusted forwardly or rearwardly by turning the adjusting screw 9' in the bracket 9, threaded through the stud in the recess; there being a spring 9'' compressed between this stud and the rear end of the recess, pressing the bracket 9 backward as the screw is turned one way, and the front end of the screw 9' bearing against the brake-band 8 to adjust it forwardly or rearwardly, accordingly as the screw is turned one way or the other.

The brake-drum 10 is annular, with its internal opening large enough to permit it to pass readily around and over the end housing plate 5 and around the regular emergency brake 6 of the vehicle, without disturbing these regular parts. It thus brings its outer flat side against the spokes 11 of the wheel 12, to which it is attached by means of U-bolts or clips 13 that straddle alternate spokes 11 and have their legs passing through holes in the web of the drum 10 with nuts 14 screwed on their inward extensions, so that the drum 10 may be very tightly clamped to the wheel 12. As the spokes 11 increase in thickness in toward the wheel hub 15, the tightly clamped U-bolts 13 are prevented from slipping toward the hub by these enlargements of the spokes, practically insuring maintenance of the drum concentric with the wheel, once it is thus positioned. Also, this positioning of the drum concentric with the wheel is very readily accomplished with a comparatively few trial adjustments before the U-bolts are fully tightened, as is found from experience.

The brake-band 8 has a suitable lining 16, which is, as I prefer to provide it, of a better quality than that with which the brakes of these vehicles are regularly provided. Also, this drum and brake are considerably larger, both in diameter and width of face, than the drums and bands of the regular vehicle brakes. These are practical advantages which I prefer to afford to the users of these cars; although it will be understood that the sizes and the quality of the braking elements may vary, within the scope of my invention.

The brake is operated by contracting the band 8 onto the face of the drum 10, this occurring as the separated front ends of the band 8 are pulled closer together. For effecting this contraction, and permitting ready release of the band from the drum when the contracting action is terminated, a suitable lever mechanism is provided with means by which it may be attached to the rear axle plate 5 and radius rod 7.

This means comprises a strut 17 that has on its rear end a semicircular fork 18 which, together with a cap 19 bolted thereto, embraces the part of the axle-housing 5' next to the end plate 5 thereof; being tightly clamped to the housing by this means. The front end of this strut 17 has on it the relatively wide short fork 20 which, together with a clamping cap 21 bolted thereto, embraces the radius rod 7 a short distance forward from the open front end of the brake-band 8; being tightly clamped to the rod 7 by this means.

The clamping cap 21 has a downward extension or arm 22, in the lower end of which is formed a transverse bearing 23 for a bell-crank lever which comprises a rearwardly normally slightly upwardly inclined arm 24 at the inner side of the bearing 23 and the forwardly extended arm 25 at the outer side of this bearing, joined by the short shaft 26 that is journaled in the bearing 23; so that the two arms, thus fixed together, may swing in upright planes lengthwise of the vehicle.

The lower front end part of the brake-band 8 has fixed to it the bearing block 27, in which is pivoted one end part of a lever 28 that has its opposite end part connected to the free end part of the bell-crank arm 25 by a short simple link 29, preferably formed by bending a round rod into shallow U-shape and passing the members of the U sidewise through the levers to form the pivots.

At about midway of the length of the lever 28, the rod 30 has its lower end part pivoted to this lever 28; extending up through a bracket 31 on the clamping cap 21 and through the head 32 of the bearing plate 33 fixed to the upper front end part of the brake-band 8. The nut 34 has a spherically rounded bottom resting in a correspondingly shaped recess 35 in the top of the head 32, and where the rod 30 passes through this head to receive this nut 34 screwed thereon, the opening 32' in the head 32 flares downwardly, so that a universal swinging of the rod 30 relatively to the brake-band 8 is permitted, to compensate for any slight inaccuracies in the relative movement of the connections. A spring 36, coiled around the rod 30 and compressed between the head 32 above and the bracket 31 below, forces the brake-band 8 loose from the drum 10 when the contracting pressure of the lever mechanism is removed. The pressure of this spring may be adjusted by means of the nut 37 and lock-nut 38, below the bracket 31.

A long connecting rod 39 has its rear end part bent out and extended through the free end part of the bell-crank arm 24, and extends forwardly and upwardly toward the front of the vehicle, being guided in a clip 40 clamped on the radius rod 7 a short distance forwardly from the mechanism just described.

It will be understood that the mechanism so far described is duplicated at the opposite sides of the vehicle, for the respective wheels, as indicated in Fig. 1; differing only in the necessary right and left arrangement.

The connecting rods 39 of the two mechanisms are converged forwardly toward the middle of the vehicle, and just to the rear of the vehicle transmission casing their front end parts are pivoted to opposite end parts of the equalizing bar 41, by having these end parts bent down and extended through said bar. To an intermediate part of this bar 41 is pivoted the rear end part of the reach rod 42, by having this end part bent up and passed through the bar. This reach rod passes through and is guided by a clip composed of the inversely assembled pieces 43 and 43' that have their lower end parts embracing the tail-shaft casing 44 of the vehicle just to the rear of the universal-joint connection of this shaft with the transmission mechanism in the housing 45. These clip pieces 43 and 43' are bolted together above and below the reach rod 42, to tightly clamp the casing 44, and are separated where the rod passes between them, limiting sidewise and up-and-down displacement of this rod and its connections. The swinging motion of the tail-shaft is very slight at this point, so that this support of these parts on the casing 44 thereof is practicable.

The front end part of the reach rod 42 is bent sidewise and extended through one ear of a clamp head 46 that is clamped, by means of its clip 47, around the shank of the pedal 48 of the regular brake equipment of the vehicle. For directly acting upon the connections made up of the rods 39 and equalizing bar and reach rod and attached parts, a tension spring 49 has one end hooked in the extended-through end of the reach rod 42, and from there is stretched to the upper sidewise extension 50 of one of the clip pieces 43. This spring thus returns these parts to released position irrespective of the action of the brake-band-releasing spring 36, which, owing to the number of separate connections and the slight looseness of these connections intervening between it and the pedal 48, as is desirable in the interest of simplicity and economy of construction, as well as the relatively great degree of swinging required of the pedal 48, could not be depended upon to swing the pedal and connections back to position for again applying the brake.

The device is very readily installed on vehicles already in use, by removing the rear wheels and attaching the brake drums thereto as described; and bolting the bracket 1 in place after merely passing it up from below the rear axle, with the brake band and operating means thereon and attached to the clamping cap 21; and then securing the strut 17 in place. This completes the rear installation for each wheel; and it will be seen that it is not necessary to work far up in the not readily accessible parts of the vehicle, nor to disturb the body or chassis parts to gain access. To complete the installation at the front, simple clamping to the tail-shaft casing, and to the pedal already on the vehicle, as before described, is all that is necessary; and these are readily accessible from below and within the vehicle body.

To operate the device, the pedal 48 is pressed forward, the same as in the vehicle as ordinarily equipped at the factory. No special extra pedal, or substitute pedal, is used; and the driver thus has nothing new to learn. This pressure on the pedal 48 acts through the reach rod 42 on the equalizing bar 41, which properly distributes the force to the brakes on the respective rear wheels, by pulling the arms 24 over forward through the medium of the connecting rods 39. This swings the arms 25 down, and with them the levers 28 which are fulcrumed on the lower ends of the brake-band 8, and, by means of the tension rods 30, pull down the other end of the brake-band; at the same time pulling up on the lower end where the fulcrum is. Thus the band is contracted around the drum. This action compresses the spring 36 between the head 32 and the bracket 31, and the pressing forward of the pedal 48 stretches the spring 49. When the forward pressure on the pedal 48 is discontinued, these springs both act to restore the parts to their original positions; the spring 36 effectively releasing the band from the drum, and the spring 49 relieving this spring 36 of the duty of returning the forward parts, such as the connecting rod 39 and connected parts forwardly thereof, to original position.

Most of the operating mechanism being mounted low, and outside the radius rods 7, not only is their installation very convenient, as before described; but they are very readily accessible for adjustment, renewal or repairs, without disturbing any other parts of the vehicle.

It will be seen that at no place is it necessary to drill or tap any holes in the regular vehicle parts; and it is very convenient to accurately aline or center the brake-drum, the adjustment of the brake-band to which is simple. These are all of the adjustments required; and any person of ordinary mechanical skill can readily install the brake on cars of the make alluded to, with the need of no tools except a suitable wrench to turn the several attaching and adjusting screws and nuts. Nor is it necessary to disrupt or deface any of the regular parts of the vehicle.

Notwithstanding its simplicity of construction, installation and adjustment, my invention greatly augments the safety, ease of control and durability of the vehicle, because applying the braking pressure every time directly to the rear wheels, as in the elaborate and far more expensive brakes of the larger more expensive vehicles, at a cost that is proportionate to the value of the vehicles of this make for which it is especially intended.

The invention may be adapted for other kinds of vehicles, however, and modifications thereof may occur under these and other varying conditions, and therefore, while certain constructional details are deemed preferable in connection with my invention, and I have shown and described these rather specifically in elucidating the construction and use of my invention, as is required, I do not wish to be understood as being limited to such precise showing and description, but having thus fully described my invention, what I claim as new and desire to secure by Letters Patent is:

1. In an attachable brake, a brake-drum, means for attaching said drum to the wheel of a vehicle, operating means for exerting braking pressure on said drum, and a strut supporting said operating means and attachable directly to the axle-casing and directly to the adjacent radius rod of said vehicle.

2. In an attachable brake, a brake-drum, means for attaching said drum to a wheel of a vehicle, a brake-band having separated front ends, a yoke comprising a part to curve under the axle-casing of said vehicle and attachable to said axle-casing, and having its rear end part attached to a rear part of said brake-band, whereby said brake-band is operatively supported around said brake-drum, elements pivoted together and pivoted to respective ones of said front ends of said brake-band, operating means connected to said elements whereby said elements may be caused to contract said brake-band onto said drum, and a strut supporting said operating means and attachable directly to said axle-casing and directly to the adjacent radius rod of said vehicle.

3. In an attachable brake, a brake-drum, means for attaching said drum to a wheel of a vehicle, a brake-band having separated front ends, a yoke comprising a part to curve under the axle-casing of said vehicle and attachable to said axle-casing, and having its rear end part attached to a rear part of said brake-band, whereby said brake-band is operatively supported around said brake-drum, elements pivoted together and pivoted to respective ones of said front ends of said brake-band, operating means connected to said elements whereby said elements may be caused to contract said brake-band onto said drum, a strut supporting said operating means and attachable to said axle-casing and to a radius rod of said vehicle, and means attachable to a forward part of the tail-shaft casing of said vehicle for supporting and guiding a forward part of said operating means.

4. In an attachable brake, a brake-drum, means for attaching said drum to a wheel of a vehicle, a brake-band having separated front ends, a yoke comprising a part to curve under the axle-casing of said vehicle and attachable to said axle-casing, and having its rear end part attached to a rear part of said brake-band, whereby said brake-band is operatively supported around said brake-drum, elements pivoted together and pivoted to respective ones of said front ends of said brake-band, a strut attachable to the axle-casing of said vehicle, attaching means for attaching the forward part of said strut to a radius rod of said vehicle, an extension on said attaching means, a bell-crank lever fulcrumed in said extension, a link connecting one arm of said lever to one of said elements whereby said elements may be caused to contract said brake-band onto said drum, a connecting rod connected to another arm of said lever and extending forwardly of said vehicle, a head attachable to the brake-pedal of said vehicle, a reach rod connected to said head and to the forward part of said connecting rod, and means attachable to the tail-shaft casing of said vehicle and supporting and guiding said reach rod.

5. In an attachable brake, a brake-drum, means for attaching said drum to a wheel of a vehicle, a brake-band, means whereby said brake-band is operatively supported around said brake-drum, operating means to contract said brake-band onto said drum, a connecting rod connected to said operating means and extending forwardly of said vehicle, a head attachable to the brake-pedal of said vehicle, a reach rod connected to said head and to the forward part of said connecting rod, means attachable to the tail-shaft casing of said vehicle and supporting and guiding said reach rod and having a lateral extension, and a spring stretched from said head to said lateral extension.

6. In an attachable brake, a brake-drum, means for attaching said drum to a wheel of a vehicle, a brake-band having separated ends, means attachable to a rear part of said vehicle for operatively supporting said brake-band around said drum, a lever having an end connected to one of said brake-band ends, a tension rod connected to the other one of said ends and to an intermediate part of said lever, attaching means attachable to a rear part of said vehicle, an extension on said attaching means, comprising a bracket through which said tension rod extends, a bell-crank lever fulcrumed in said extension, a link connecting one arm of said bell-crank lever to the other end of said lever to which said tension rod is connected, and operative connecting means connected to another arm of said bell-crank lever.

7. In an attachable brake, a brake-drum, means for attaching said drum to a wheel of a vehicle, a brake-band having separated ends, means attachable to a rear part of said vehicle for operatively supporting said brake-band around said drum, a lever having one end connected to one of said brake-band ends, a head on the other one of said ends, having a downwardly flaring opening and a concavity in its top around said opening, a tension rod extending through said opening, a nut screwed on said tension rod with a rounded bottom in said concavity, said tension rod being also connected to an intermediate part of said lever, attaching means attachable to a rear part of said vehicle, an extension on said attaching means, comprising a bracket through which said tension rod extends, a bell-crank lever fulcrumed in said extension, a link connecting one arm of said bell-crank lever to the other end of said lever to which said tension rod is connected, and operative connecting means connected to another arm of said bell-crank lever.

8. In an attachable brake, a brake-drum, means for attaching said drum to a wheel of a vehicle, a brake-band having separated ends, means attachable to a rear part of said vehicle for operatively supporting said brake-band around said drum, a lever having an end connected to one of said brake-band ends, a tension rod connected to the other one of said ends and to an intermediate part of said lever, attaching means attachable to a rear part of said vehicle, an extension on said attaching means, comprising a bracket through which said tension rod extends, a spring compressed between said bracket and the end of the brake-band to which the tension rod is connected, an adjusting nut screwed onto said tension rod against the lower side of said bracket, a bell-crank lever fulcrumed in said extension, a link connecting one arm of said bell-crank lever to the other end of the lever to which the tension rod is connected, and operative connecting means connected to another arm of said bell-crank lever.

9. In an attachable brake, a brake-drum, means for attaching said drum to a wheel of a vehicle, a brake-band having separated ends, means attachable to a rear part of said vehicle for operatively supporting said brake-band around said drum, a lever having an end connected to one of said brake-band ends, a tension rod connected to the other one of said ends and to an intermediate part of said lever, a strut attachable directly to the axle-casing of said vehicle, attaching means for attaching the forward part of said strut directly to a radius rod of said vehicle, an extension on said attaching means, comprising a bracket through which said tension rod extends, a bell-crank lever fulcrumed in said extension, a link connecting one arm of said bell-crank lever to the other end of said lever to which said tension rod is connected, and a connecting rod connected to another arm of said lever and extending forwardly of said vehicle.

10. In an attachable brake, a brake-drum, means for attaching said drum to a wheel of a vehicle, a brake-band having separated ends, means attachable to a rear part of said vehicle for operatively supporting said brake-band around said drum, a lever having one end connected to one of said brake-band ends, a head on the other one of said ends, a tension rod extending through said head and connected thereto and connected to an intermediate part of said lever, a strut attachable to the axle-casing of said vehicle, attaching means for attaching the forward part of said strut to a radius rod of said vehicle, an extension on said attaching means, comprising a bracket through which said tension rod extends, a spring compressed between said head and said bracket, a bell-crank lever fulcrumed in said extension, a link connecting one arm of said bell-crank lever to the other end of said lever to which said tension rod is connected, and a connecting rod connected to another arm of said lever and extending forwardly of said vehicle.

11. In an attachable brake, a brake-drum, means for attaching said drum to a wheel of a vehicle, a brake-band having separated ends, means attachable to a rear part of said vehicle for operatively supporting said brake-band around said drum, a lever having one end connected to one of said brake-band ends, a head on the other one of said ends, a tension rod extending through said head and connected thereto and connected to an intermediate part of said lever, a strut attachable to the axle-casing of said vehicle, attaching means for attaching the forward part of said strut to a radius rod of said vehicle, an extension on said attaching means, comprising a bracket through which said tension rod extends, a spring compressed between said head and said bracket, an adjusting nut screwed onto said tension rod against the lower side of said bracket, a bell-crank lever fulcrumed in said extension, a link connecting one arm of said bell-crank lever to the other end of said lever to which said tension rod is connected, and a connecting rod connected to another arm of said bell-crank lever and extending forwardly of said vehicle.

12. In an attachable brake, a brake-drum, means for attaching said drum to a wheel of a vehicle, a brake-band having separated ends, means attachable to a rear part of said vehicle for operatively supporting said brake-band around said drum, a lever having one end connected to one of said brake-band ends, a head on the other one of said ends, having a downwardly flaring opening and a concavity in its top around said opening, a tension rod extending through said opening, a nut screwed on said tension rod with a rounded bottom in said concavity, said tension rod being also connected to an intermediate part of said lever, a strut attachable to the axle-casing of said vehicle, attaching means for attaching the forward part of said strut to a radius rod of said vehicle, an extension on said attaching means, comprising a bracket through which said tension rod extends, a bell-crank lever fulcrumed in said extension, a link connecting one arm of said bell-crank lever to the other end of said lever to which said tension rod is connected, and a connecting rod connected to another arm of said bell-crank lever and extending forwardly of said vehicle.

13. In an attachable brake, a strut having a forked end and a cap on said end whereby said strut is attached to a vehicle axle-casing, said strut having its other end forked, and a cap on this other end for attaching said strut to a radius rod of a vehicle.

14. In an attachable brake, a strut having a forked end and a cap on said end whereby said strut is attached to a vehicle axle-casing, said strut having its other end forked, and a cap on this other end for attaching said strut to a radius rod of a vehicle, comprising an extension having a bearing therein and a bracket having a guiding opening therein.

ELMER R. RITTER.